United States Patent [19]

Fisher et al.

[11] Patent Number: 5,804,903
[45] Date of Patent: Sep. 8, 1998

[54] MOTOR SHAFT DISCHARGE DEVICE

[76] Inventors: Rodney R. Fisher, 3175 NW. Crocker La., Albany, Oreg. 97321; Hugh E. Boyanton, 146 Kevin Way, Salem, Oreg. 97306

[21] Appl. No.: 493,931

[22] Filed: Jun. 23, 1995

Related U.S. Application Data

[63] Continuation-in-part of Ser. No. 141,350, Oct. 22, 1993.
[51] Int. Cl.$^6$ .......................... H02K 13/10; H01R 39/46
[52] U.S. Cl. ........................ 310/248; 310/221; 310/249; 310/219
[58] Field of Search .................................. 310/68 R, 71, 310/219, 220, 221, 229, 233, 237, 231, 249, 248

[56] References Cited

U.S. PATENT DOCUMENTS

| | | | |
|---|---|---|---|
| 2,375,818 | 5/1945 | Peters | 310/248 |
| 2,959,697 | 11/1960 | Clarke | 310/232 |
| 3,226,666 | 12/1965 | Lord | 339/5 |
| 3,286,069 | 11/1966 | Bugg | 200/166 |
| 4,019,076 | 4/1977 | Bates | 310/233 |
| 4,139,251 | 2/1979 | Miller et al. | 339/5 M |
| 4,323,805 | 4/1982 | Caby et al. | 310/237 |
| 4,347,456 | 8/1982 | Chabrerie | 310/248 |
| 4,355,253 | 10/1982 | Vollbrecht | 310/239 |
| 4,403,164 | 9/1983 | Preece | 310/232 |
| 4,492,602 | 1/1985 | Lee et al. | 148/11.5 C |
| 4,566,744 | 1/1986 | Engelenburg et al. | 339/8 L |
| 4,684,179 | 8/1987 | Freeman | 439/27 |
| 4,831,295 | 5/1989 | Posedel . | |
| 4,873,512 | 10/1989 | Miller | 340/679 |
| 4,939,506 | 7/1990 | Gram | 340/649 |
| 4,954,084 | 9/1990 | Pugh et al. | 439/29 |
| 4,992,691 | 2/1991 | Mlynarz | 310/232 |
| 5,222,572 | 6/1993 | Yamagiwa et al. | 180/220 |
| 5,227,950 | 7/1993 | Twerdochlib | 361/221 |
| 5,233,499 | 8/1993 | Twerdochlib | 361/212 |

FOREIGN PATENT DOCUMENTS 1338869  11/1973  United Kingdom ................... 310/212

OTHER PUBLICATIONS

Lawson, J. Allan; "Motor Bearing Fluting"; IEEE (conference record of) Annual Pulp and Paper Industry Technical Conference; Hyannis, Massachusetts; Jun. 21–25, 1993; pp. 32–35.

Kerszenbaum, Isidor; "Shaft Currents in Electric Machines Fed by Solid State Drives"; 1992 IEEE (conference record of the) Industrial and Commercial Power Systems Technical Conference; Pittsburgh, Pennsylvania; May 4–7, 1992; pp. 71–79.

Jones, Roger W.; Seaver, Delbert E.; "Investigation and Results of Eddy Currents on DC Motor Bearings"; 1990 EEE (conference record of the) Annual Pulp and Paper Industry Technical Conference; Seattle,Washington; Jun. 18–22, 1990; pp. 145–150.

Prashad, Har; "Theoretical and Experimental Investigations on the Pitch and Width of Corrugations on the Surfaces of Ball Bearings"; WEAR (an international journal on the science and technology of friction, lubrication and wear); vol. 143, No. 1, pp. 1–14; Mar. 10, 1991.

*Primary Examiner*—Thomas M. Dougherty
*Assistant Examiner*—Judson H. Jones
*Attorney, Agent, or Firm*—Dellett and Walters

[57] ABSTRACT

A grounding system for an AC or DC motor or other rotating apparatus comprising a conductive brush in resilient contact with a contamination-free conductive member removably secured onto a rotating part such as a motor shaft or tachometer shaft. The contacting surface is preferably formed of brass and is shielded from contamination from motor bearings and the like, for reliably shunting the shaft to the frame of the machine so as to avoid high voltage transients across bearings as would otherwise result in bearing damage or destruction. A brush housing or holding means positions the brush in juxtaposition with the rotating conductive member and cooperates to substantially enclose the region of contact between the brush and the conductive member. The apparatus defines a cavity for extending the immediate enclosed region of contact between the brush and the conductive member for the purpose of receiving and holding residue produced by the brush as the shaft rotates, thereby preserving a clean room environment in which the motor may be utilized.

11 Claims, 12 Drawing Sheets

MOTOR SHAFT DISCHARGE DEVICE

CROSS REFERENCE TO RELATED APPLICATION

This application is a continuation-in-part of our application Ser. No. 08/141,350 filed Oct. 22, 1993, and entitled MOTOR SHAFT DISCHARGE DEVICE of which Ser. No. 622,917 filed Mar. 27, 1996 is a continuation, now U.S. Pat. No. 5,661,356.

BACKGROUND OF THE INVENTION

The present invention relates to an apparatus for electrically discharging a shaft and more particularly a rotating shaft of an AC or DC machine employing a solid-state, variable-speed drive.

It is known that bearing assemblies suffer premature wear, i.e., "fluting", when journalling shafts carrying excessive voltage levels. A shaft of an electric motor, or even a non-driven roller, can inductively or capacitively couple electrical energy such that voltage or current levels may exceed a given threshold, thereby causing an electrical discharge through a bearing/race discharge site. The discharge pits the bearing and race at the vicinity of the discharge and the pitting damage results in fluting of the bearing race assembly. Electric motors are especially vulnerable to such bearing degradation when employing solid-state, variable-speed drives.

Isidor Kerszenbaum, "Shaft Currents and Electrical Machines Fed by Solid-State Drives", 1992 *IEEE Industrial and Commercial Power Systems Technical Conference,* 1992 Conference Record, pages 71–79, provides two primary theories according to which solid-state switching devices of a variable-speed drive induce current in a motor shaft. According to the first current inducement method, "dissymmetry effects", the reluctance path of a motor changes as a function of the angular position of the motor's rotor due to magnetic asymmetries of either a stator or a rotor core. For instance, a stator core of the motor may have two air gaps of differing gap widths on opposing sides of the stator for preventing magnetic saturation therein. As a rotor of the machine rotates within the surrounding stator, the magnetic poles of the rotor create asymmetric reluctance paths about the stator core in accordance with the angular position of the rotor's magnetic poles and the gap width ratio between the two air gaps of the stator.

According to the alternative "homopolar flux effects" mechanism outlined by Kerszenbaum, the induced currents are attributed to a form of axial magnetization. However, the homopolar flux effects mechanism is considered primarily relevant to only large and fast rotating machines, i.e., turbo generators, and is of little consequence for most machines driven by solid-state, variable-speed drive.

J. Allan Lawson, "Motion Bearing Fluting", 1993 *Annual Pulp and Paper Industries Technical Conference,* 1993 Conference Record, pages 32–35, discusses dynamic changes inside an electric motor as causing induced shaft currents, with non-uniform air-gap magnetic flux transitions within the motor being the primary cause. An air-gap flux of an electric motor originates from "field" (stator) poles of the motor. Ideally each field pole is identical to the other field poles for providing balanced excitation of the motor. However, in reality, the windings of the various poles differ from one another resulting in non-uniform excitation of the motor such that non-uniform magnetic flux transients cross the shaft for inducing currents within the shaft. The magnitude of the induced currents is determined in accordance with the extent of the magnetic non-uniformity and the rate of change associated with the flux transitions.

Solid state variable speed drives are used with electrical motors for controlling the speed of the motor. For DC motors, pulse width or phase duty cycle modulation is employed for adjusting the average DC current level. For AC synchronous motors, the solid state switches provide pulse trains for synthesizing a desired frequency signal. However, the switching transients associated with these techniques produce abrupt current transients causing rapid magnetic flux transitions within the motor. Thus, a motor employing a solid state variable speed drive, and having a given level of magnetic imbalance, will suffer induced current levels of a greater magnitude than the same motor without the variable speed drive.

The relationship can be explained in accordance with Lenz's law wherein, $$E=-DC/DT;\ V=-d\varnothing/dt$$

Voltage is generated by the changing magnetic field wherein the voltage magnitude is related to the rate of flux variation. Thus, for the induced currents in a motor shaft, the solid-state devices of a variable-speed controller, which rapidly switch currents through the field or armature windings, generate magnetic fields which change quickly with respect to time. If the flux lines cross the shaft in a non-uniform manner, the flux transitions induce voltages, and likewise currents, within the shaft at levels related to the rate of change of the flux transition and the motor's magnetic imbalance.

As with the shaft of an electrical motor, it is also possible for a non-driven machine shaft to electrostatically accumulate charge, acquiring a voltage level. For instance, paper generating static electricity while being rolled about the shaft of a roller can cause charge to accumulate on the shaft until a given voltage level is built up whereupon an electrical discharge occurs through a bearing/race assembly journalling the shaft, causing pitting.

Regardless of the manner in which the shaft acquires a voltage or current, electrical discharge through the bearing assembly is undesirable in that such electrical discharge leads to bearing failure. The electrical discharge pits the bearing and race at the discharge interface. Eventually the pitting leads to "fluting" (a characteristic wear within the assembly) and failure. To prevent premature failure, the machine may be constructed magnetically symmetric, or an alternative shaft discharge path provided around the bearing assembly. One known discharge apparatus for a rotating shaft which is typically steel, comprises a grounding brush contacting the outside diameter of the rotating shaft. However, the electrical interface of a steel motor shaft and carbon brush is less than ideal for providing a reliable electrical contact therebetween. The steel shaft of the motor builds up an insulating oxide layer for degrading the electrical interface, while grease and oil from the motor or roller bearing assembly accumulate on the shaft and contaminate the electrical interface. Therefore, in order to assure the reliability for such a grounding brush technique, it would be necessary that the brush/shaft assembly be cleaned or maintained frequently to prevent oxidation, film and contamination build-up for assuring reliable electrical contact.

Another prior art technique employs a copper ring within a motor which is received onto the shaft in a heated condition and then allowed to cool for providing a snug fit about the shaft, providing a copper contacting surface for a grounding brush. However, the copper can corrode and likewise accumulate grease and external matter thereon for the same reasons the shaft does. Furthermore, to fit a heated copper ring over the shaft, it is required that the motor be disassembled for inserting the copper ring.

According to our application cross referenced above, an advantageous low resistance motor shaft grounding system is provided which avoids contamination of grounding contacts. Enhanced protection is thereby afforded to the motor bearing assembly, leading to longer motor life. The previously described grounding system is efficacious in many environments but additional problems are encountered under "clean room" conditions common in the electronics industry. Grounding systems employ a carbon brush for providing contact with a rotating member secured to a motor shaft. As a result of brush wear during many hours of operation, a residue in the form of carbon dust is produced that is objectionable in the clean room.

Moreover, there is a need for more easily applicable and adjustable grounding systems for DC motors provided with tachometers. Also, a low cost grounding system is needed for external application to household motors and the like.

Therefore, it is an object of the present invention to provide an improved apparatus for discharging a rotating shaft.

It is another object of the present invention to provide an improved apparatus for discharging a rotating shaft in a clean room environment.

It is another object of the present invention to provide an improved shaft grounding system that is easily adapted for substantially external application to rotating machinery.

It is a further object of the present invention to provide an improved shaft grounding system which is more easily adjustable.

SUMMARY OF THE INVENTION

In accordance with an aspect of the present invention, a motor shaft, or other rotating member, is provided with a contact member having a contacting surface adapted to avoid sources of contamination. The contact member is removably coupled for rotation with the shaft and electrically connected thereto. A protective housing positions a brush in juxtaposition with the rotating contacting surface for grounding electrical voltage transients to the frame of the machine.

In accordance with another aspect of the present invention, the grounding apparatus defines a cavity for extending the immediate region of contact between the aforementioned contact member and brush for the purpose of receiving and holding residue produced by the brush as the shaft rotates.

In accordance with another feature, a shaft grounding system, adapted for application to a motor tachometer, does not require disassembly of the tachometer. A further grounding system is easily adapted for external attachment to small motors. In accordance with a further feature, enhanced adjustability is provided.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
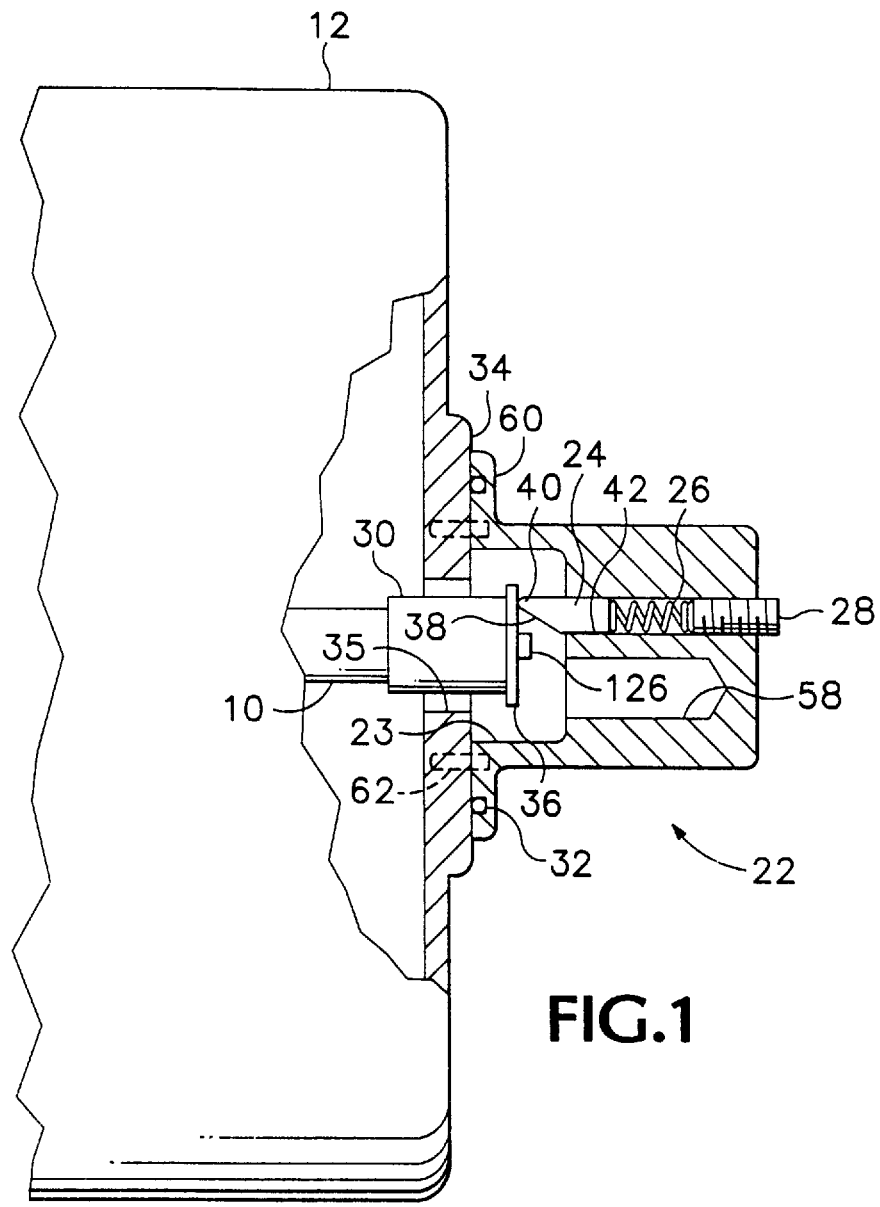
FIG. 1 is a broken-away side view, partially in longitudinal cross section, of a motor incorporating a grounding system according to the present invention.
Figure 1A:
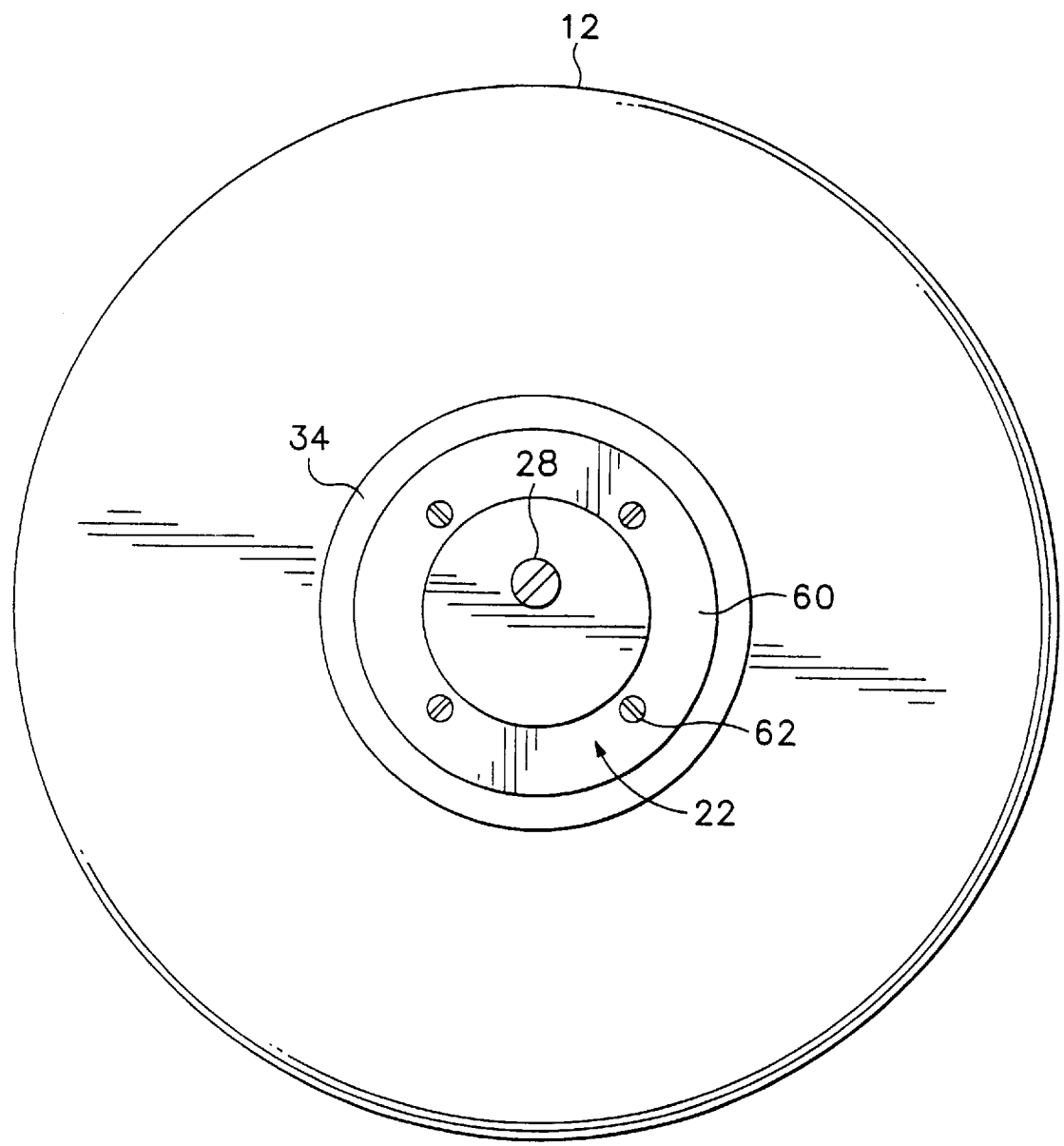
FIG. 1A is an end view of the FIG. 1 motor and system.

Referring to the drawings and particularly to FIGS. 1 and 1A, one end of shaft 10 of machine 12 is provided with a contact means in the form of a cylindrical rotor 30 that extends the shaft through an aperture 35 provided in boss portion 34 at the end of the machine. The rotor is preferably formed of brass and is provided with a planar, disk-shaped end cap 36 disposed in orthogonal relation to the shaft. The end of the shaft is threaded to engage a screw 126 for securing rotor 30 to the end of the shaft.

The machine 12, by way of example, comprises an AC motor of the type which is not provided with a cooling fan and is intended for use in a clean room environment. The aperture 35, normally covered, is in this case enclosed by means of a cylindrical end housing 22 suitably formed of aluminum. The housing 22 is disposed in coaxial relation to the motor shaft 10 and is provided with a radial flange 60 at its base. The flange is secured to boss portion 34 of the machine 12 via an O-ring seal or gasket located in a groove in flange 60 between the flange and boss portion 34. Housing 22 is secured to machine 12 with screws 62.

Housing 22 is open toward machine 12, having a cylindrical recess 23 adapted to receive the rotor 30 and particularly the planar disk portion 36 thereof. The forward portion of the housing remote from machine 12 includes a first bore 42, in parallel relation to the axis of shaft 10 but offset therefrom, for receiving carbon brush 24 which is urged into continuously contacting juxtaposition with respect to disk portion 36 by spring 26 located in the bore 42 between the brush and retaining screw 28. The disk portion 36 provides a durable, contamination-free, electrical contacting surface for the brush and is, of course, in electrically conductive relation with shaft 10. The housing 22 in turn comprises means for forming a circuit path coupling the brush back to the frame of machine 12 since the housing contacts machine 12.

Since the brush is slidably received in bore 42 and is off center with respect to the axis of shaft 10, the brush rides toward the outside contacting surface of disk portion 36 in advantageous sliding relation. The end of the brush is desirably beveled at 38 away from the axis of the shaft to provide contacting tip 40 adjacent the outside diameter of disk portion 36. Of course, with brush wear, more of the brush tip will contact the surface of disk portion 36.

Recess 23 of housing 22 substantially encloses the immediate region of contact between rotor 30 and brush 24, isolating this region from the external clean room environment and also from the interior of machine 12. It will be noted that disk portion 36 is comparable in outside diameter to the inside diameter of aperture 35 and tends to shield the region of contact between disk portion 36 and the brush from motor bearing contaminants as might reduce the effectiveness of the shorting action of the brush. The immediate region of contact between the rotor and the brush is extended by a cavity 58 in the form of a cylindrical well or bore disposed in generally parallel relation to bore 23 and also in offset relation to the axis of machine 10. The cavity 58 is adapted to receive and hold residue produced by the brush 24 as it rides against disk portion 36 of rotor 30, such residue taking the form of carbon dust and the like. Thus, while the shaft of the machine is efficiently grounded for substantially eliminating shaft voltages, the carbon residue produced is retained rather than expelled to the clean room environment. Of course, when the brush becomes worn, the housing 22 is removed from machine 12 by loosening screws 62. At that time, residue is removed and the carbon brush is replaced.

Figure 2:
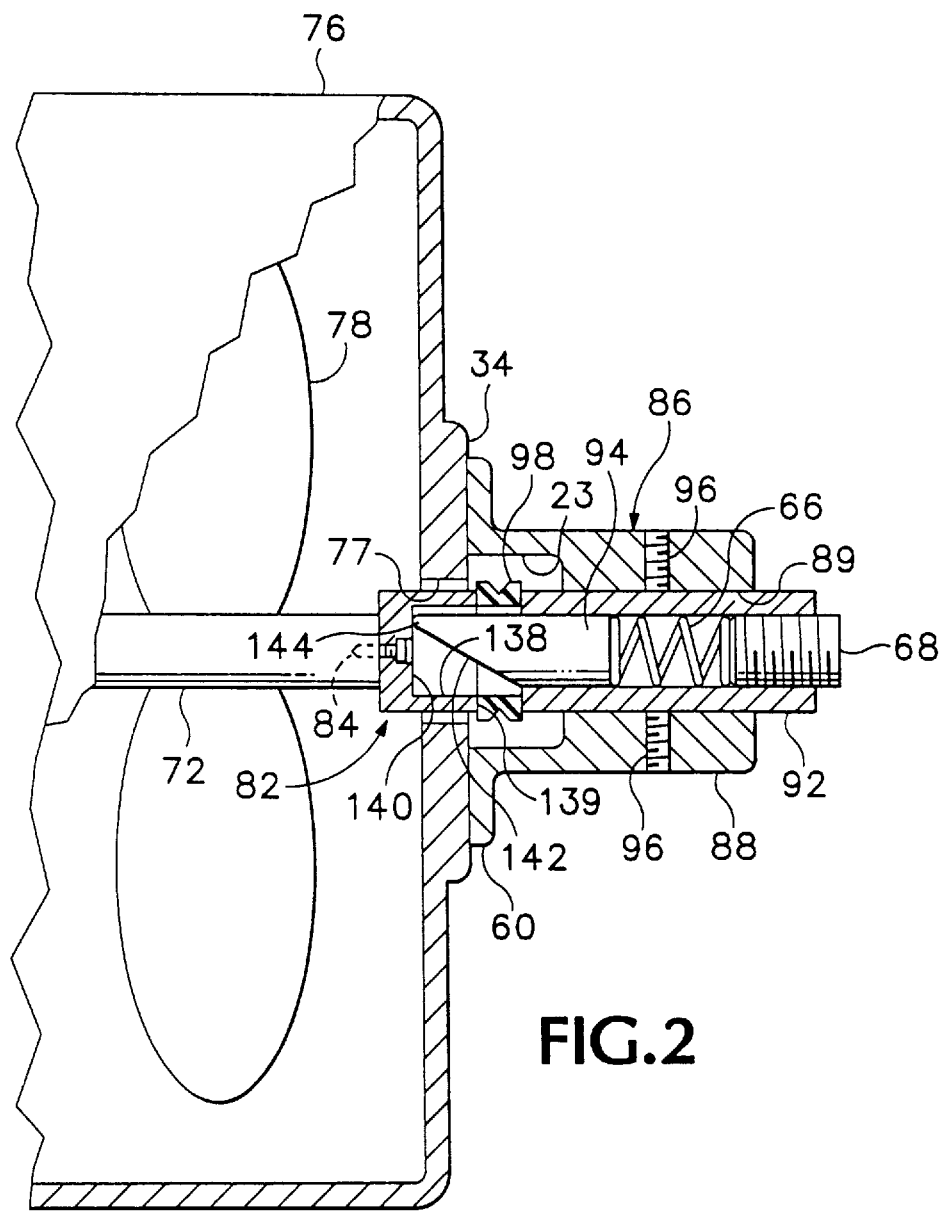
FIG. 2 is a side view, partially broken-away and partially in longitudinal cross section, of a motor incorporating a grounding system according to a second embodiment of the present invention.
Figure 2A:
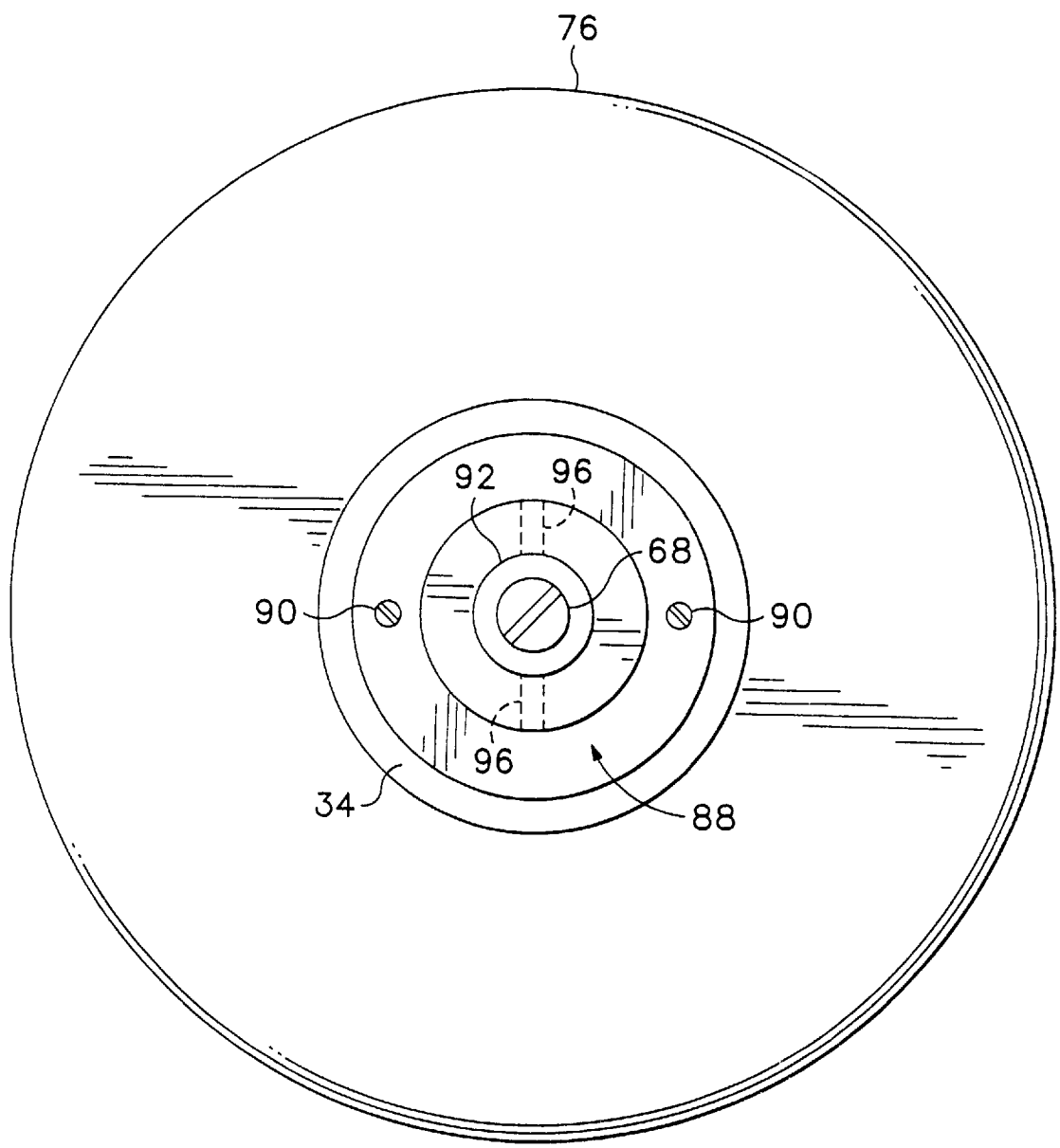
FIG. 2A is an end view of the FIG. 2 motor and system.

Referring to FIGS. 2 and 2A, a further embodiment of a shaft grounding system according to the present invention is applicable to a fan-cooled AC motor which is also located in a clean room environment. The motor has a fan 78 mounted on shaft 72 within fan housing 76 provided with an end aperture 77 in boss portion 34. According to this embodiment, contact means 82 comprises a cup-shaped member formed of brass and mounted coaxially to the end of shaft 72 or an extension thereof by end screw 84 located in a countersunk hole in the end of the cup-shaped contact means. The contact means is cylindrical, having a cylindrical interior side wall 138 and an inner end 140 which adjoins the side wall 138 and is orthogonal to the axis of shaft 72 for providing a contacting surface against which tip 144 of brush 94 rides. It will be noted that cup-shaped contact member 82 extends at least part way through and in fairly close spaced relation to aperture 77 in boss portion 34, while the contact member is open ended in the direction axially away from the motor.

The embodiment of FIGS. 2 and 2A further comprises cylindrical brush housing 86 suitably formed of brass and comprising outer cylindrical member 88 coaxial with shaft 72 as well as radial flange 60 secured to boss portion 34 by means of screws 90. The housing 86 is recessed and also has an axial bore 89 in the forward end of member 88 for receiving a cylindrical brass member 92 in coaxial relation with shaft 72. Member 92 in turn receives brush 94 as well as spring 66 and retainer screw 68 adjustable for urging brush 94 and specifically tip 144 thereof into continuous resilient engagement with inner end 140 of contact member 82. Brush 94 is disposed in juxtaposition with the end of the contact member 82 and in parallel relation to the cylindrical interior of the contact member, but the end of the brush is beveled at 142 to provide brush tip 144 which is offset with respect to the shaft axis for contacting inner end 140 at a position away from the axis and substantially adjacent the cylindrical inner side wall 138 of the contact member. The brush and the inside cross section of cylindrical member 92 are suitably keyed, e.g. square or hexagonal in cross section toward the brush end of cylindrical member 92, so that the orientation of brush tip 144 is maintained. When the brush is worn down beyond bevel 142, the brush is suitably replaced.

Between the inner end of cylindrical member 92 and the open edge 139 of cup-shaped contact member 82 is located a compressible ring 98 disposed in surrounding relation to brush 94. This compressible ring is suitably an elastomeric V-ring, e.g. formed of rubber, and having a split or V-shaped rim at its widest part so that it may be compressed. The V-ring is compressed when the system is installed by loosening radial set screws 96 in member 88 that hold cylindrical member 92 in place, after which cylindrical member 92 is positioned for compressing V-ring 98 against edge 139. Set screws 96 are tightened to secure member 92 in the desired position.

The V-ring completes a configuration for not only protecting the contact area between brush 94 and member 82 from external grease and moisture, but also for avoiding release of residue, namely carbon dust, into the clean room environment. The cup-shaped contact member 82 extends axially past the tip of brush 94 toward recess 23 in housing 86, thereby to extend the immediate region of brush contact, cooperating to form a cavity for receiving and holding the residue produced by the brush as the shaft rotates. Again it will noted that the system effectively grounds the machine shaft to the frame of the machine since housing 86 completes a grounding circuit path.

Figure 3:
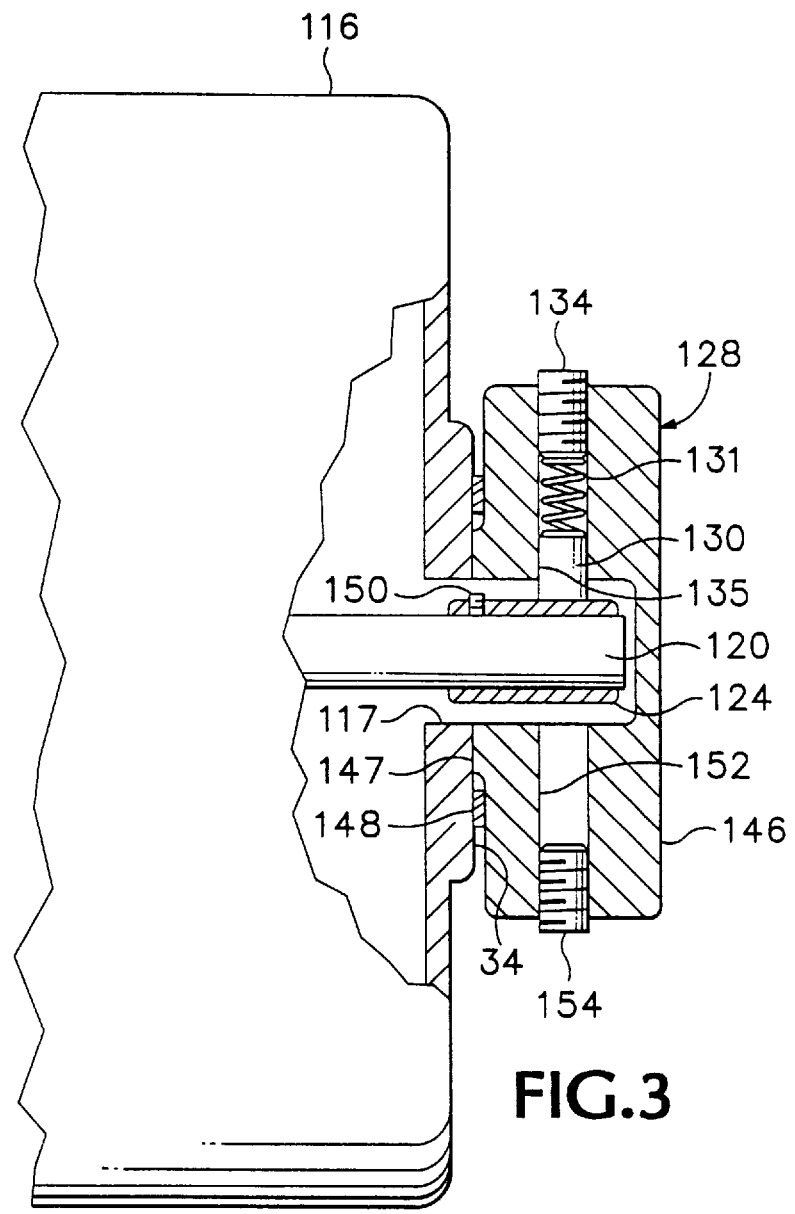
FIG. 3 is a partially broken-away side view, partially in longitudinal cross section, of a motor incorporating a grounding system according to a third embodiment.
Figure 3A:
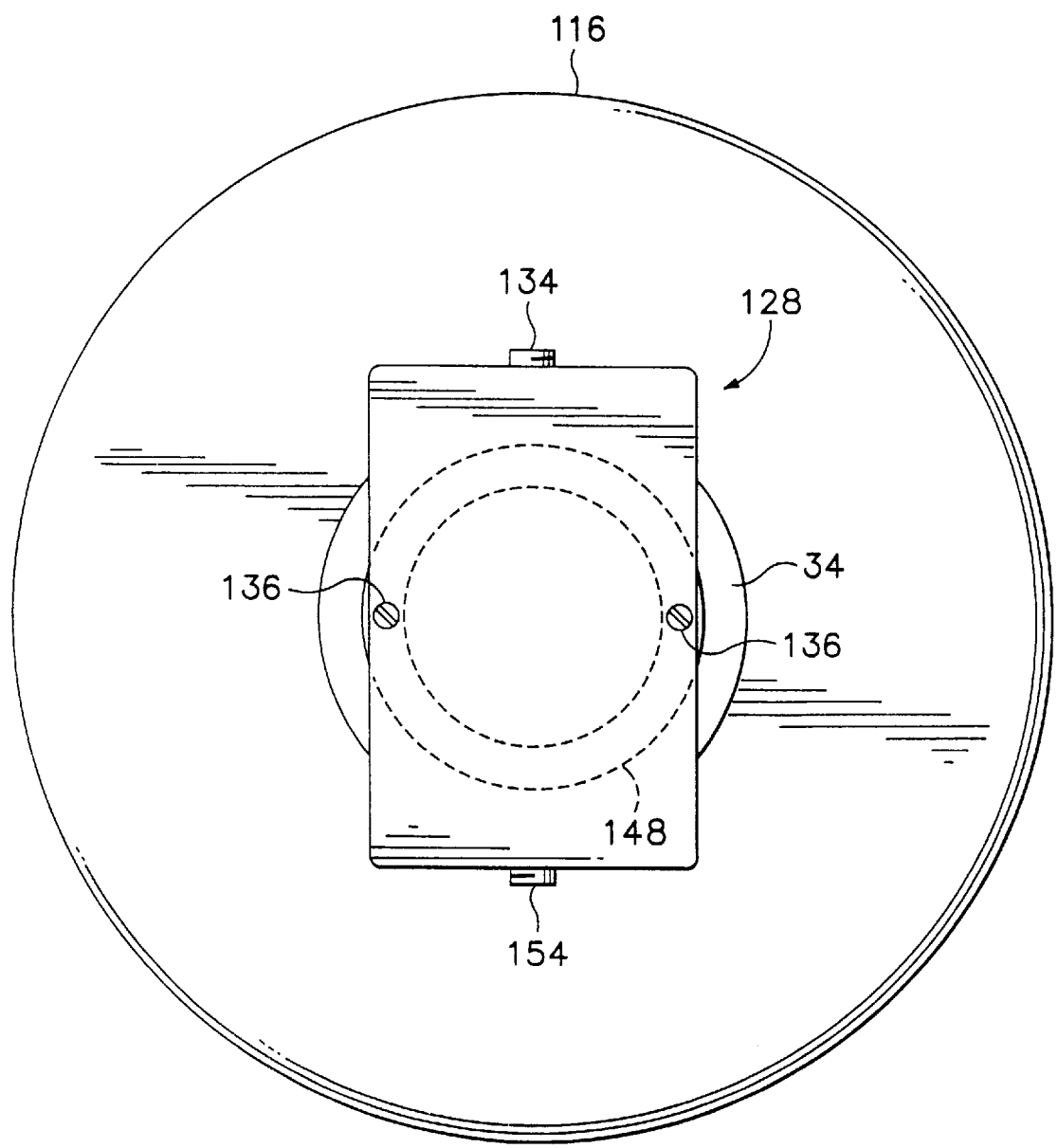
FIG. 3A is an end view of the FIG. 3 motor and system.

FIGS. 3 and 3A illustrate an embodiment adapted for providing a grounding system in the case of smaller machines. Machine 116, which may comprise an AC motor adapted for a clean room environment, has a shaft or shaft extension 120 passing through aperture 117 in boss portion 34. Contact means 124 here comprises a conductive, preferably brass, sleeve received over the end of shaft 120 and secured thereto by set screw 150. The sleeve 124 extends within a central side bore of a metal, e.g. aluminum, housing 128 which is vertically elongate and provided with end bores in the housing's elongate vertical direction, radially of the axis of shaft 120 and contact sleeve 124. Upper bore 135 houses brush 130 in juxtaposition with sleeve 124, and is threaded for mating with retainer screw 134 for adjusting the pressure on brush 130 as provided by intermediate spring 131, whereby brush 130 resiliently and continuously contacts the outer cylindrical surface of sleeve 124. Lower bore 152, conveniently aligned with upper bore 135 in a position below sleeve 124, defines a cavity for extending the immediate enclosed region of contact between sleeve 124 and the brush for the purpose of receiving and holding residue, e.g. carbon dust, produced by the brush as the shaft rotates. The lower portion of bore 152 is threaded to receive plug 154 removable for withdrawing carbon residue. A gasket 148 is located between the inner side of housing 128 and boss portion 34 of machine 116 to seal the unit from the environment, with screws 136 employed to secure the housing 128 to the machine. Screws 136 are disposed at either side of housing 128 and pass through apertures in gasket 148 before reception into tapped holes in the end of machine 116. The inner side of housing 128 toward machine 116 is provided with a circular land 147 coaxial with shaft 120 for bearing against boss area 34 and completing a circuit path through housing 128 whereby to accomplish grounding of shaft 120.

Figure 4:
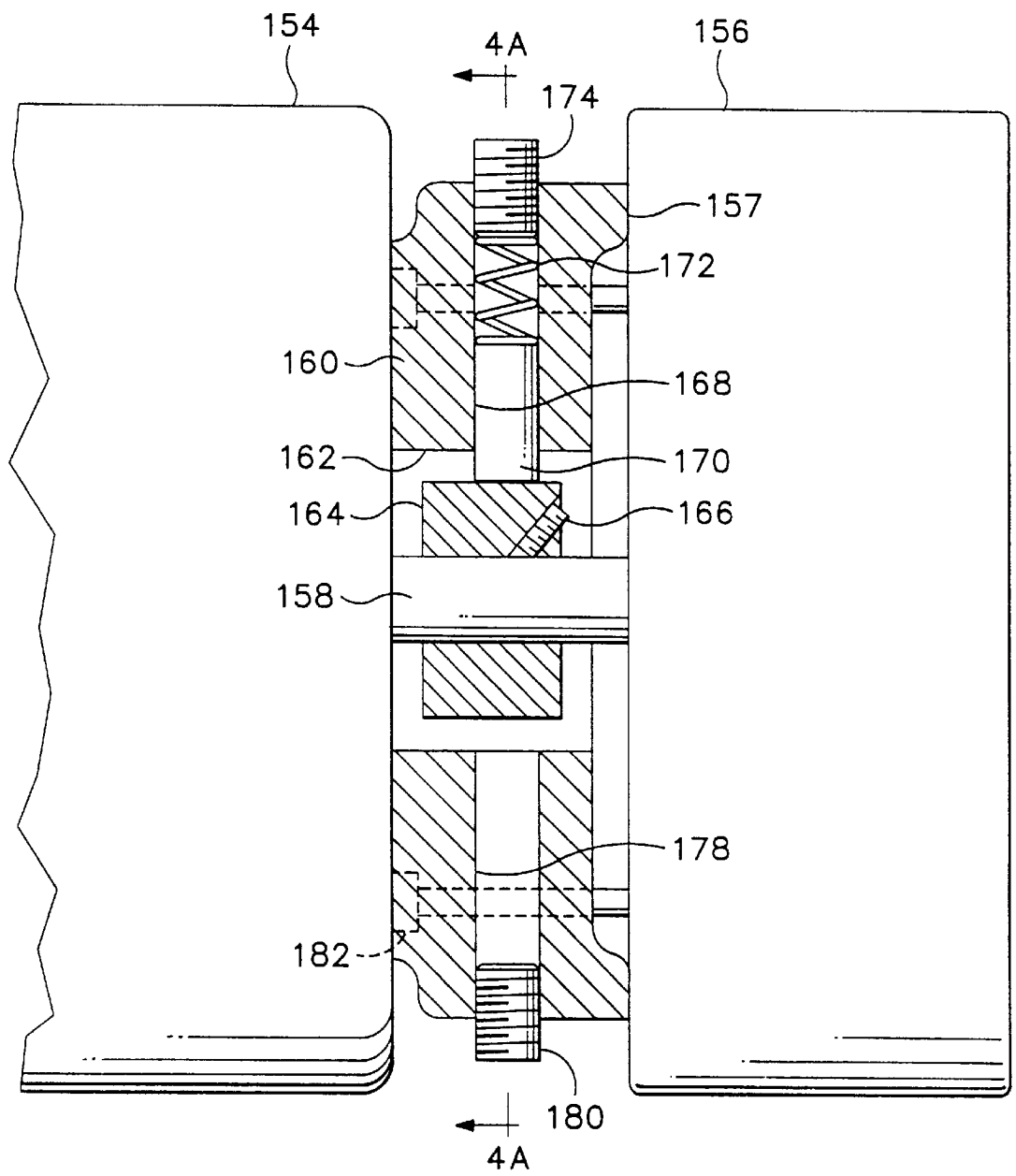
FIG. 4 is a side view of a motor and a tachometer having a grounding system according to a fourth embodiment of the present invention located therebetween, as shown in cross section.
Figure 4A:
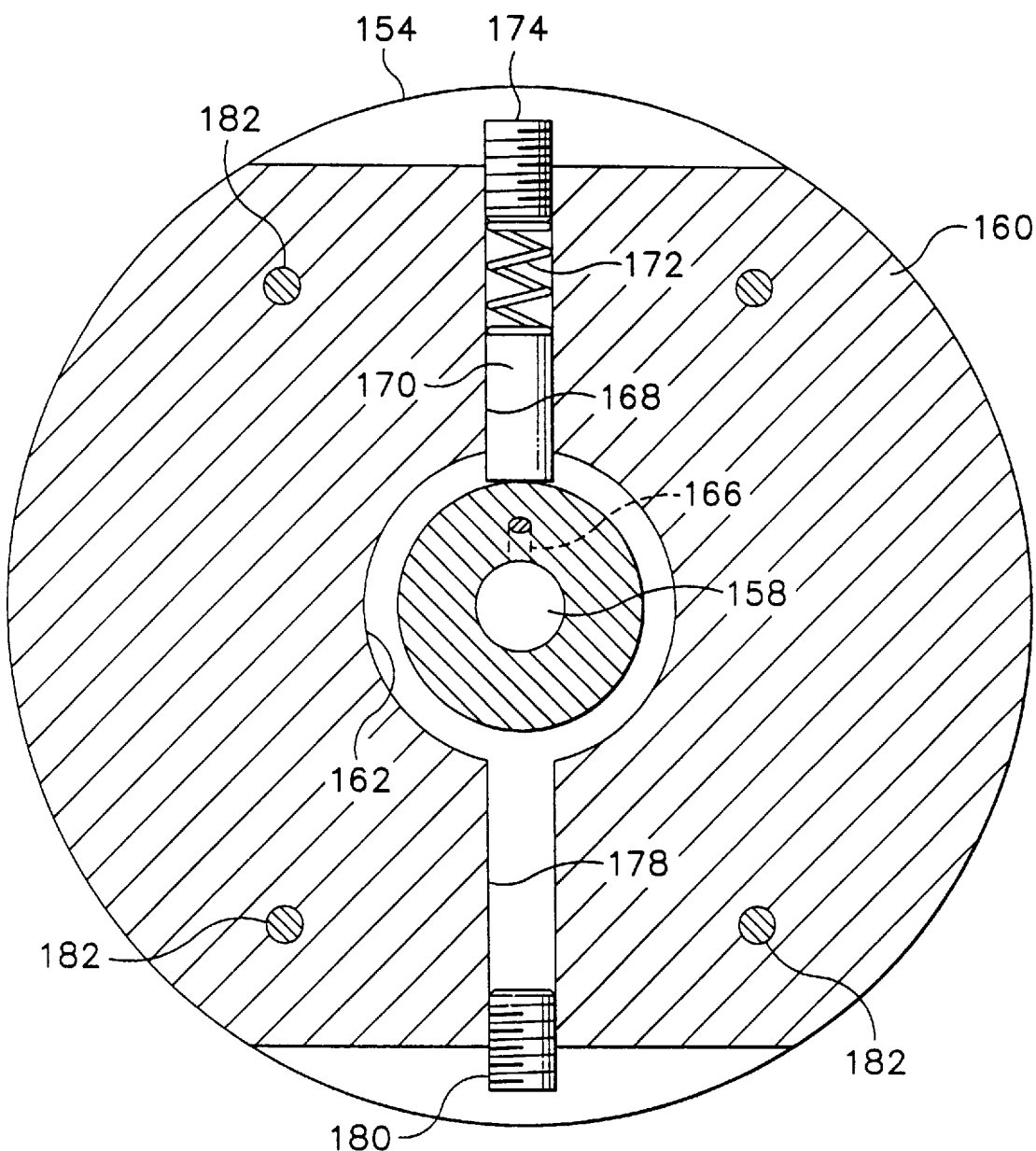
FIG. 4A is a cross section of the FIG. 4 embodiment as taken at 4A—4A in FIG. 4.

Referring to FIGS. 4 and 4A, an embodiment of a grounding system according to the present invention is illustrated which is suitable for mounting between a first machine 154, comprising a DC motor or motor coupling, and a second machine 156, typically comprising a tachometer. This embodiment is advantageous for applications where it is not desired to access the interior of a tachometer (as subsequently described, for example, in connection with FIGS. 5 and 5A) to provide a suitable grounding system, i.e., where an independent system is preferred. Substantially cylindrical housing 160 is secured to the face of machine 156 by means of bolts 182 and is provided with a central aperture 162 through which shaft 158 (typically the tachometer shaft) extends. The contact means for the grounding system comprises a cylindrical rotor 164 formed of brass and slidably received upon shaft 158. An angularly disposed set screw 166 accessible from the forward side of the rotor secures the motor to the shaft.

Radial bores 168 and 178 in housing 160 are suitably aligned vertically within the housing, respectively above and below the rotor 164. Bore 168 slidably receives brush 170 in juxtaposition with the cylindrical surface of the rotor and is urged into resilient contacting relation with the rotor via retainer screw 174 and spring 172. Lower bore 178 cooperates to provide a cavity for extending the immediate enclosed region of contact between rotor 164 and brush 170 for receiving and holding residue produced by the brush as the shaft rotates. Lower plug 180 closes bore 178 and is threadably removable for withdrawing collected residue.

As indicated, the housing 160 is secured in juxtaposition with the machine 156, contacting the latter around circumferential axial flange 157 and may be provided with an O-ring seal in a groove, not shown. The combination of machine 156 and housing 160 is secured against the face of machine 154 by exterior mounting means, also not shown. The housing, advantageously formed of aluminum, provides the grounding circuit for shorting shaft 158 to the frames of the machines.

Figure 5:
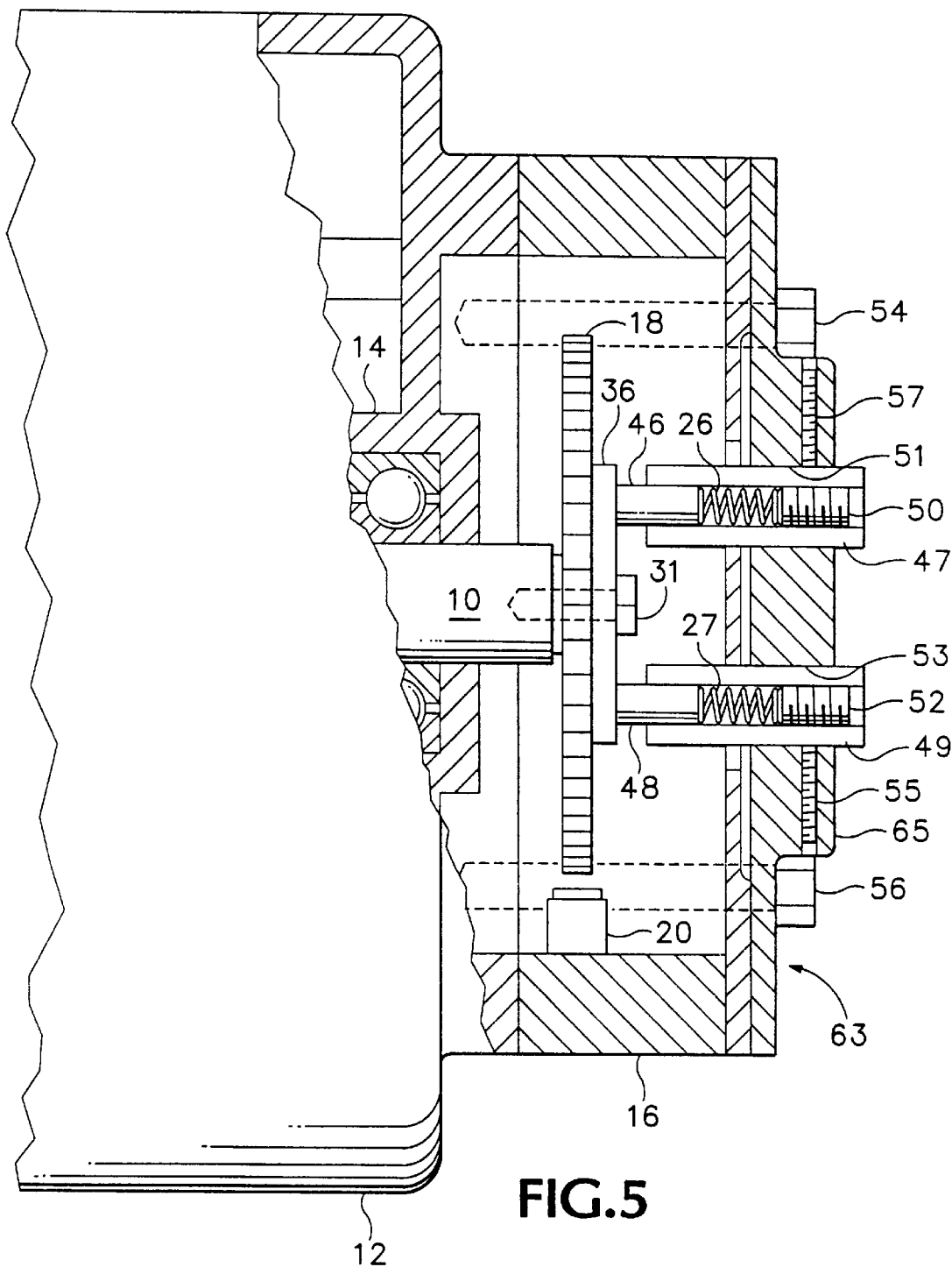
FIG. 5 is a partially broken-away side view, partially in cross section, of a motor incorporating a grounding system according to a fifth embodiment.
Figure 5A:
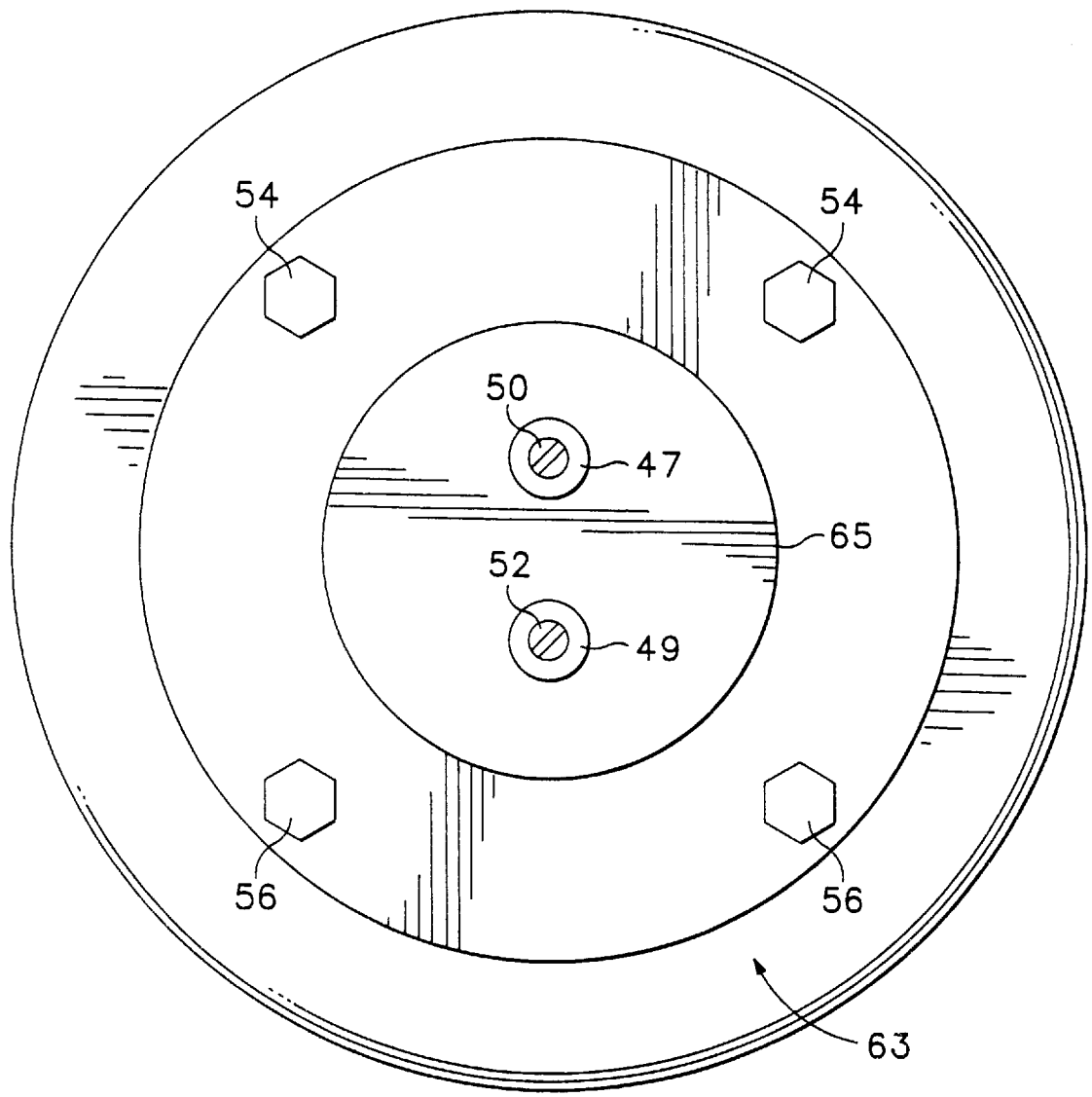
FIG. 5A is an end view of the FIG. 5 motor and grounding system.

Referring to FIGS. 5 and 5A, the shaft 10 of DC motor 12 is rotatably supported in bearings 14, the shaft extending into a tachometer housing 16 provided with a tachometer wheel 18 coupled to the end of the motor shaft. The tachometer 16 is attached at the commutator end of the DC machine and is further provided with a tachometer sensor 20 which supplies a signal in accordance with the number of teeth on the tachometer wheel passing the sensor, thereby indicating motor speed. In accordance with the invention, the tachometer outer cover is removed and replaced by a grounding system comprising housing 63 having an inner hub 65 for receiving brushes in juxtaposition with contact means 36 comprising a brass or aluminum disk secured to the tachometer wheel with threaded member 31. The disk 36 provides a contacting surface outwardly of machine 12 that is substantially orthogonal to the axis of shaft 10. Hub 65 has greater axial thickness than the remainder of housing 63 and is provided with bores 51 and 53 parallel to shaft 10 and disposed on either side of the axis thereof for receiving slidable cylinders 47 and 49 forming part of the housing for positioning brushes 46 and 48 in resilient contact with the orthogonal forward surface of disk 36. The brushes 46 and 48 are slidably received within the cylinders 47 and 49 respectively, while retaining screws 50 and 52 adjustably provide pressure on brushes 46 and 48 by way of intermediate springs 26 and 27. The cylinders 47 and 49 are advantageously positionable in hub 65 and secured at desired positions via radial set screws 55 and 57 threadably received in hub 65. Bolts 54 and 56 secure the outer radial flange of housing 63 as well as tachometer 16 to machine 12. Again, housing 63, which is suitably formed of aluminum, provides the grounding path back to the frame of the machine via the frame of tachometer 16.

Figure 6:
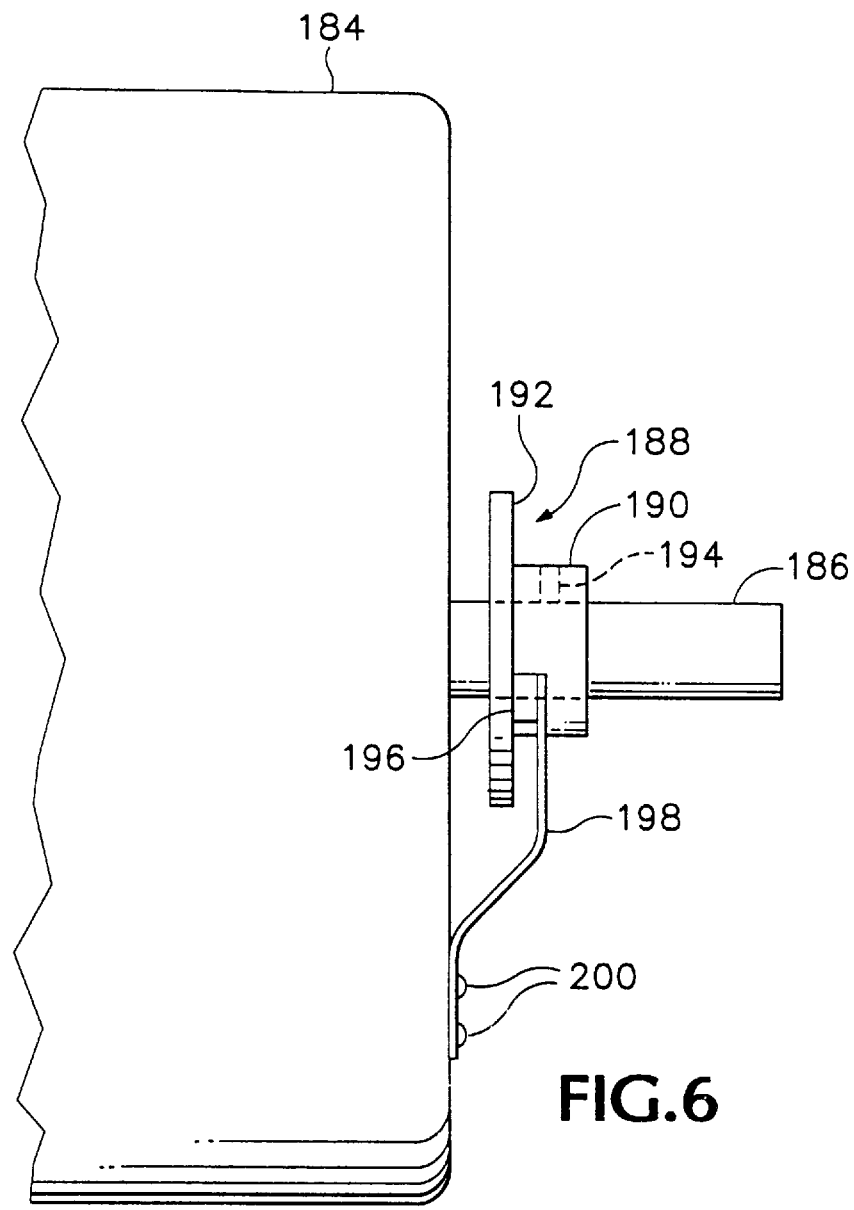
FIG. 6 is a partially broken-away side view of a motor incorporating a grounding system according to a sixth embodiment.
Figure 6A:
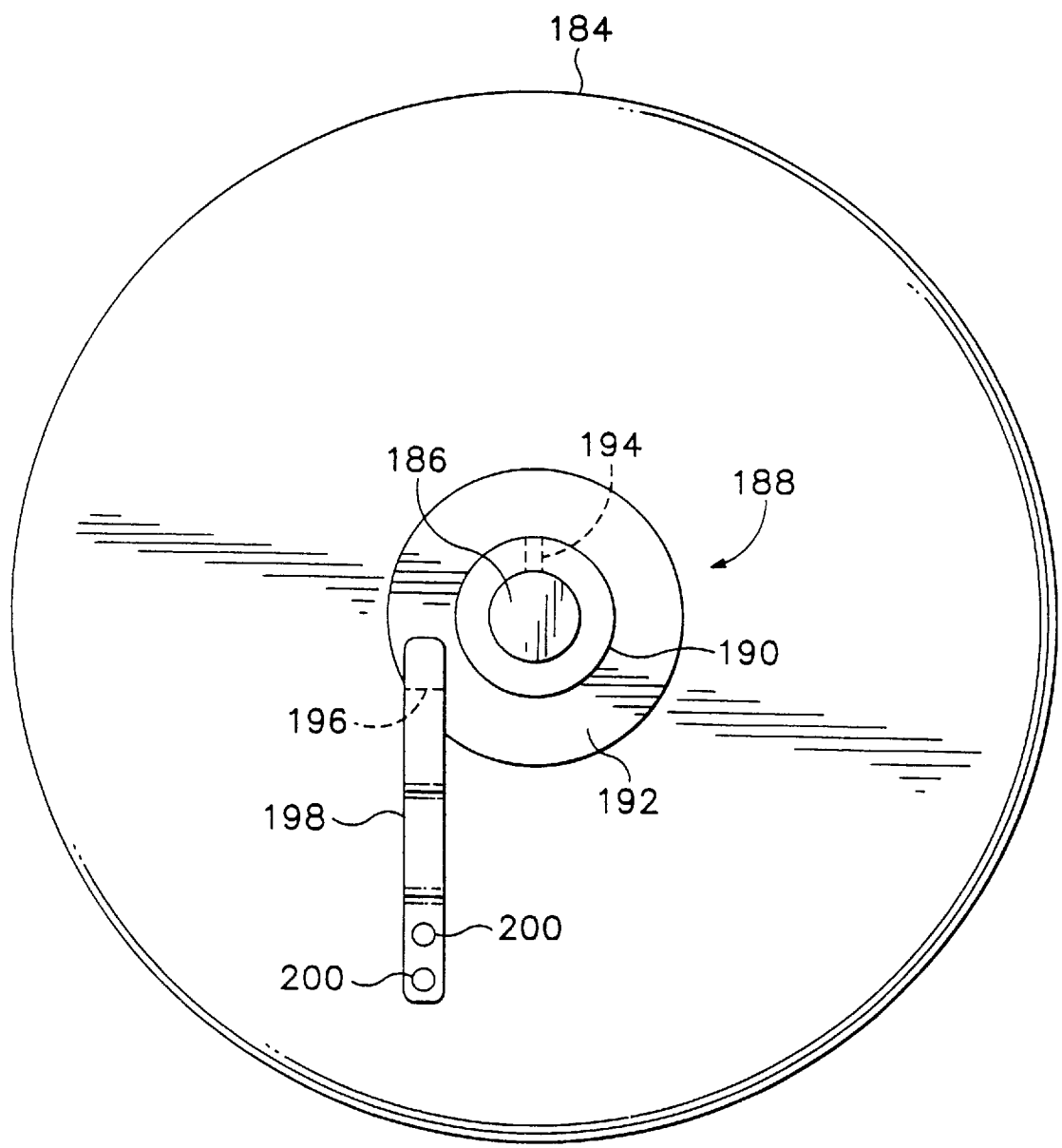
FIG. 6A is an end view of the FIG. 6 motor and grounding system.

Referring to FIGS. 6 and 6A, a simplified grounding system is illustrated, which system is adapted for shaft grounding of smaller machines such as household motors. The shaft 186 of motor 184 receives a contact means 188 comprising an axial member 190 received on shaft 186 and having a radial flange portion 192 providing a contacting surface facing away from the machine, the contacting surface being substantially orthogonal to the axis of shaft 186. The contact means 188 is suitably formed of brass and is coaxially secured to shaft 186 by set screw 194. A conductive brush 196, e.g. a carbon brush member, is attached to the end of a brush holding means comprising a conductive flat spring 198 secured to the frame of machine 184 via screws 200. As illustrated in FIG. 6, the holding spring 198 is formed to curve away from the machine and exert pressure back toward the outer side of flange 192 so as to hold brush 196 in resilient contact with the outer surface of flange 192. It will be seen that a continuous grounding circuit is provided via member 198 to the frame of the machine, while flange 192 protects the contacting region between brush 196 and flange 192 from grease or other contamination from the machine bearings. As illustrated in FIG. 6A, the spring 198 is suitably mounted by screws 200 to place brush 196 in tangential sliding relation with the forward or outer surface of flange 192.

The brushes hereinbefore described are carbon brushes as employed in the electric motor industry, and are preferably copper impregnated carbon brushes. In particular, grade number 672 as supplied by Helwig Carbon, Inc. has been utilized in the described embodiments and is preferred.

The contact member has been hereinabove described as preferably formed of brass. In the hereinabove referenced embodiments, a brass comprising SAE 660 continuous cast bearing bronze (UNS C 93 200) was utilized and is preferred. This brass has a composition of 83% copper, 7% tin, 7% lead and 3% zinc. It is not intended, however, that the present invention be limited to a particular grade or composition of brush or contact material. It is in any case preferred that the contacting surface comprise a non-magnetic, highly conductive, corrosion-resistant surface, and in some instances stainless steel can be substituted for brass but brass is preferred. The grade of brush is selected for making a low resistance, continuous connection with the contacting surface.

While several embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. Apparatus for electrically discharging a rotating shaft of a machine, said machine having a frame supporting bearings journalling said shaft, said apparatus comprising:

contact means for providing a durable, contamination free, electrical contacting surface, said contact means comprising a member distinct from said shaft but removably joined to said shaft for rotation with said shaft and in electrically conductive relation therewith, said member where it provides said surface being formed of a highly conductive corrosion resistant material as compared with said shaft;

a conductive brush for resiliently and continuously contacting said surface of said contact means during rotation thereof to complete continuous low resistance frictional contact with said surface; and a housing for slidably receiving said conductive brush in juxtaposition with said contact means so the brush can engage said contact means, said housing including means forming a circuit path for coupling said brush to the frame of said machine so as to complete a continuous, low impedance discharge circuit for said shaft across said bearings;

said apparatus defining a cavity for extending the immediate region of contact between said contact means and said brush for receiving and holding residue produced by said brush as said shaft rotates;

wherein said housing is secured to said machine and is substantially closed except for passage of said shaft carrying said contact means;

wherein said contact means is supported from the end of said shaft and is cup shaped, being open ended in the direction axially away from said machine, said brush extending from said housing into the open end of the cup-shaped contact means for contacting the inner end of the contact means closest to said machine; and further including an elastomeric ring in surrounding relation to said brush and compressed from said housing toward the open edge of the cup-shaped contact means, said cup-shaped contact means cooperating to provide said cavity.

2. The apparatus according to claim 1 wherein said cup-shaped contact means has a substantially cylindrical interior, said brush being positioned in parallel relation to the axis of said cylindrical interior and said shaft but having a contacting tip offset with respect to said axis to engage the inner end of said contact means between said axis and the cylindrical interior wall of said contact means.

3. The apparatus according to claim 2 wherein said brush has a tapered end engaging said inner end of said contact means, said brush end tapering away from said axis so that said brush end where it engages the inner end of said contact means is adjacent the cylindrical interior wall of said contact means.

4. Apparatus for electrically discharging a rotating shaft of a machine, said apparatus comprising:

contact means for providing a durable, contamination free, electrical contacting surface, said contact means being coupled for rotation with said shaft while being electrically connected thereto;

a conductive brush for resiliently and continuously contacting said surface of said contact means during rotation thereof; and a housing for slidably receiving said conductive brush in juxtaposition with said contact means so the brush can engage said contact means, said housing providing means cooperating to substantially enclose the region of contact between said contact means and said brush for isolating said region from the machine and the environment, said housing including means forming a circuit path for coupling said brush to the frame of said machine so as to complete a discharge circuit for said shaft;

said apparatus defining a cavity for extending the immediate enclosed region of contact between said contact means and said brush for the purpose of receiving and holding residue produced by said brush as said shaft rotates;

wherein said housing is secured to said machine and is substantially closed except for passage of said shaft carrying said contact means;

wherein said contact means is supported from the end of said shaft and is cup shaped, being open ended in the direction axially away from said machine, said brush extending from said housing into the open end of the cup-shaped contact means for contacting the inner end of the contact means closest to said machine, and further including an elastomeric ring in surrounding relation to said brush and compressed from said housing toward the open edge of the cup-shaped contact means, said cup-shaped contact means cooperating to provide said cavity;

wherein said cup-shaped contact means has a substantially cylindrical interior, said brush being positioned in parallel relation to the axis of said cylindrical interior and said shaft but having a contacting tip offset with respect to said axis to engage the inner end of said contact means between said axis and the cylindrical interior wall of said contact means; and wherein said housing includes a cylindrical member slidably positionable in said housing and in turn slidably receiving said conductive brush, said elastomeric ring being compressed between said cylindrical member and the open edge of said cup-shaped contact means.

5. Apparatus for electrically discharging a rotating shaft of a machine, said apparatus comprising:

contact means for providing a durable, contamination free, electrical contacting surface, said contact means being coupled for rotation with said shaft while being electrically connected thereto;

a conductive brush for resiliently and continuously contacting said surface of said contact means during rotation thereof; and a housing for slidably receiving said conductive brush in juxtaposition with said contact means so the brush can engage said contact means, said housing providing means cooperating to substantially enclose the region of contact between said contact means and said brush for isolating said region from the machine and the environment, said housing including means forming a circuit path for coupling said brush to the frame of said machine so as to complete a discharge circuit for said shaft;

said apparatus defining a cavity for extending the immediate enclosed region of contact between said contact means and said brush for the purpose of receiving and holding residue produced by said brush as said shaft rotates;

wherein said housing is secured to said machine and is substantially closed except for passage of said shaft carrying said contact means;

wherein said contact means comprises a cylindrical member secured to said shaft, said housing being provided with a first bore for receiving said brush, said first bore extending radially toward the outer cylindrical surface of said cylindrical member, and a second bore for providing said cavity; and wherein said housing is oriented on said machine with said first bore extending vertically downwardly toward said cylindrical extension member, said second bore extending vertically below said cylindrical extension member, and said second bore having a removable plug for withdrawing said residue.

6. Apparatus for electrically discharging a rotating shaft of a machine, said apparatus comprising:

contact means for providing a durable, contamination free, electrical contacting surface, said contact means being coupled for rotation with said shaft while being electrically connected thereto;

a conductive brush for resiliently and continuously contacting said surface of said contact means during rotation thereof; and a housing for slidably receiving said conductive brush in juxtaposition with said contact means so the brush can engage said contact means, said housing providing means cooperating to substantially enclose the region of contact between said contact means and said brush for isolating said region from the machine and the environment, said housing including means forming a circuit path for coupling said brush to the frame of said machine so as to complete a discharge circuit for said shaft;

said apparatus defining a cavity for extending the immediate enclosed region of contact between said contact means and said brush for the purpose of receiving and holding residue produced by said brush as said shaft rotates;

wherein said housing is juxtaposed with respect to said machine and is substantially cylindrical, being further adapted for juxtaposition with the face of a second machine located at the side of said housing remote from the first mentioned machine;

said housing having a cylindrical aperture for receiving said shaft extending between said machines;

said contact means comprising a cylindrical member received upon said shaft within said cylindrical aperture;

said housing being provided with a first radial bore for receiving said brush in contacting relation with the outer cylindrical surface of said contact means and a second bore for providing said cavity.

7. The apparatus according to claim 6 wherein said bores are aligned in a substantially vertical direction, said first bore extending above said contact means for aligning said brush with said contact means, and said second bore extending below said contact means for receiving said residue, said second bore having a removable plug for withdrawing said residue.

8. Apparatus for electrically discharging a rotating shaft of a machine, said machine having a frame supporting bearings journalling said shaft, the end of said shaft having a contacting surface, said apparatus including means for holding a conductive brush in resilient and continuous frictional contact with said contacting surface at said end of said shaft so as to provide a continuous frictional contact with said contacting surface to provide a continuous electrical discharge path for said shaft for shunting transients to frame ground as would otherwise appear across said bearings and damage said bearings, wherein said holding means urges said brush in a direction substantially longitudinal of said shaft toward said contacting surface, said contacting surface being provided by a contact means supported from the end of said shaft, said contact means being cup-shaped and open ended in the direction axially away from said machine, said brush extending into the open end of the cup-shaped contact means for contacting the inner end of the contact means.

9. The apparatus according to claim 8 wherein said brush is tapered toward said inner end of said contact means to provide initial contact at an area at the tip of said brush which subsequently enlarges with brush wear.

10. The apparatus according to claim 9 wherein said brush is tapered such that it initially engages said contact means between the axis of said shaft and a cylindrical side wall of said cup-shaped contact means.

11. Apparatus for electrically discharging a rotating shaft of a machine, said apparatus comprising:

contact means for providing a durable, contamination free, electrical contacting surface, said contact means being coupled for rotation with said shaft while being electrically connected thereto;

a conductive brush for resiliently and continuously contacting said surface of said contact means during rotation thereof; and a housing for slidably receiving said conductive brush in juxtaposition with said contact means so the brush can engage said contact means, said housing including means forming a circuit path for coupling said brush to the frame of said machine so as to complete a discharge circuit for said shaft;

said apparatus defining a cavity for extending the immediate region of contact between said contact means and said brush for the purpose of receiving and holding residue produced by said brush as said shaft rotates; and wherein said contact means is supported from the end of said shaft and is cup shaped, being open ended in the direction axially away from said machine, said brush extending from said housing into the open end of the cup-shaped contact means for contacting an inner end of the contact means closest to said machine, and further including an elastomeric ring in surrounding relation to said brush and compressed toward said cup-shaped contact means, said cup-shaped contact means cooperating to provide said cavity.

* * * * *